United States Patent [19]

Kakuma et al.

[11] Patent Number: 5,555,265
[45] Date of Patent: Sep. 10, 1996

[54] SWITCHING PATH SETTING SYSTEM USED IN SWITCHING EQUIPMENT FOR EXCHANGING A FIXED LENGTH CELL

[75] Inventors: Satoshi Kakuma; Shiro Uriu; Noriko Samejima; Kazuo Hajikano, all of Kanagawa, Japan

[73] Assignee: Fujitsu Limited, Kanagawa, Japan

[21] Appl. No.: 332,379

[22] Filed: Oct. 31, 1994

[30] Foreign Application Priority Data

Feb. 28, 1994 [JP] Japan .................................. 6-029334

[51] Int. Cl.⁶ .................................................... H04L 12/56
[52] U.S. Cl. ............................ 370/60; 370/61; 370/85.6
[58] Field of Search ........................ 370/58.2, 60, 60.1, 370/94.1, 85.6, 84, 85.7, 61; 340/825.51

[56] References Cited

U.S. PATENT DOCUMENTS

| | | | |
|---|---|---|---|
| 5,132,966 | 7/1992 | Hayano et al. | 370/85.6 |
| 5,179,557 | 1/1993 | Kudo | 370/60 |
| 5,233,606 | 8/1993 | Pashan et al. | 370/60 |
| 5,267,232 | 11/1993 | katsube et al. | 370/94.1 |
| 5,390,176 | 2/1995 | Schoute et al. | 370/60.1 |

FOREIGN PATENT DOCUMENTS

| | | |
|---|---|---|
| 55-8132 | 1/1980 | Japan. |
| 3101339 | 4/1991 | Japan. |
| 3267847 | 11/1991 | Japan. |
| 4336832 | 11/1992 | Japan. |

OTHER PUBLICATIONS

IEEE Conference magazine, vol. 29, No. 10, (Oct. 1991) pp. 46–53, particularly refer to lines 40 to 52, right column, p. 50.

IEEE Communications magazine, vol. 92 No. 348 SSE92–88, Nov. 1992, pp. 31–36, particularly refer to FIG. 2(a).

*Primary Examiner*—Benedict V. Safourek

[57] ABSTRACT

A switching path setting system is disposed between an input line connected to switching equipment and a switch. An input interface device allocates a cell to a quality class as tag information corresponding to an identifier of the cell. A quality class buffer stores the cell corresponding to the quality class allocated by the input interface device corresponding to the quality class. A cell is read from the quality class buffer at a band allocated to each quality class.

11 Claims, 11 Drawing Sheets

FIG. 3B SWITCHING EQUIPMENT FORMAT

FIG. 3A LINE FORMAT

| VPI / VCI | DECLARED BAND | QUALITY CLASS |
|---|---|---|
| VCI 1 | 1 M | 0 |
| 2 | 1 M | 0 |
| 3 | 10 M | 1 |
| 4 | 10 M | 2 |
| 5 | 5 M | 0 |
| 6 | 50 M | 3 |
| 7 | 20 M | 1 |
| 8 | 2 M | 0 |
| 9 | 20 M | 2 |
| ⋮ | | |

FIG. 6

SWITCHING PATH SETTING SYSTEM USED IN SWITCHING EQUIPMENT FOR EXCHANGING A FIXED LENGTH CELL

BACKGROUND OF THE INVENTION

1. Field of the Invention

The present invention relates to a switching path setting system used in switching equipment for exchanging a fixed length cell, for example an ATM (Asynchronous Transfer Mode) switch, including a plurality of quality classes.

2. Description of the Related Art

It is required to send a variety of kinds of information such as voice, text data, moving pictures (or moving image data), in a communication system. In other words, a flexible switching system for exchanging a wide range of data transmission speeds is needed. An ATM system is one of these kinds of system.

In the ATM system, information is divided into fixed length (48 bytes) data. At the beginning of fixed length data, five bytes of control information (address information and the like) is added. This control information is referred to as a header. The resultant information block with a total of 53 bytes is referred to as a cell. In the ATM system, when information is transmitted at high speed, the number of cells transmitted per unit time is increased. When information is transmitted at low speed, the number of cells transmitted per unit time is decreased. In such a manner, the transmission speed of information can be easily adjusted. Thus, in the ATM system, a variety of services ranging from low speed information of the order of several kbps such as telephone voice data to high speed information of the order of around several 100 Mbps such as moving images can be integrally handled.

The routing of a cell is controlled by a VPI (Virtual Path Identifier) and a VCI (Virtual Channel Identifier) that are stored in the header thereof. In other words, when a cell is input to ATM switching equipment, it retrieves a VCI conversion table (VCCT) corresponding to the VPI/VCI of the cell. The VCI conversion table stores tag information including routing information in the ATM switching equipment and VPI/VCI added to an output cell corresponding to the VPI/VCI of the input cell. When a call is set, the content of the VCI conversion table is written. Thus, when a cell is input to the switching equipment, the VPI/VCI of the cell is rewritten using the VCI conversion table. In addition, the tag information that determines the routing in the switching equipment is added to the cell. The cell is routed in the switching equipment corresponding to the tag information and then output to a predetermined output line.

Since the ATM system integrally handles the above-mentioned various services, a plurality of data transmissions may be concentrated to a particular path and the sum of data transmission bands may exceed the capacity of the path. When the data transmissions exceed the capacity of the path, a transmission error or the like will take place. To prevent such a problem, ATM switching equipment is normally provided with a shaping function. The shaping function causes each cell to be temporarily stored in a buffer memory and the read speed of the cell from the buffer memory to be controlled so as to alleviate the periodical concentration of the traffic. As the construction of the buffer memory, there are for example cross-point type, input buffer type, output buffer type, and common buffer type. In the cross-point type, buffers are disposed at the cross-point of input and output of each switching element. In the input buffer type, a buffer is disposed at an input of the switching equipment. In the output buffer type, a buffer is disposed at an output of the switching equipment. In the common buffer type, a buffer is shared by all inputs or outputs of the switching equipment.

However, when a burst-like traffic such as data transmission in LAN is input, such a buffer memory will get instantaneously overflowed- In this case, the overflowed cells will be discarded.

The various services that the ATM provides require respective quality, such as quality for cell transmission time (absolute delay time and delay fluctuation) and quality for cell loss ratio (error ratio). In addition, each service requires different quality class. For example, when LAN data is transmitted by the ATM system, since it normally has data retransmission function that allows data to be retransmitted between terminals upon occurrence of a transmission error that takes place therebetween, even if a cell is discarded, it is retransmitted by the data retransmission function. Thus, in this case, the quality request for the cell loss ratio is not so strict. On the other hand, when image data is transmitted without such a data retransmission function, if high image quality is required, even a slight cell loss may adversely affect the image quality. Thus, in this case, the quality request for the cell loss ratio is very strict.

However, so far, characteristics of the path in the switching equipment have not been satisfactorily analyzed. If a cell is discarded due to for example burst-like data input, it is difficult to know in what service the cell was discarded. Thus, when the buffer gets overflowed, a cell whose quality request for the cell loss ratio is not strict may not be discarded. Instead, a cell whose quality request for the cell loss ratio is strict may be discarded.

Although the ATM switching equipment can process packet information corresponding to a frame-relay switching technique, this technique causes a path that is larger than a physical band to be allocated. Thus, if congestion takes place with packets corresponding to the frame-relay switching technique, it tends to adversely affect other ATM cells. Consequently, the ATM cells may be discarded, thereby deteriorating the quality of data transmission. In this case, it is difficult to know in what service ATM cells were discarded.

In the related art reference, priority and nonpriority concerning discarding cells are performed corresponding to a CLP (Cell Loss Priority) bit in the header of each of the cells. The CLP bit is a control bit where "0" and "1" represent priority cell and non-priority cell, respectively. When the buffer gets overflowed, the non-priority cells are discarded so as to prevent the priority cells from being discarded and maintain the quality of the priority cells. However, by the control method using the CLP bit, only two levels of priority are allocated. Thus, cell quality control for various services cannot be flexibly performed.

To solve such a problem, for example, when a call is set, a predetermined band of the switching equipment is allocated to the call corresponding to a declared band and a required quality. In this method, a predetermined band of the switching equipment should be allocated to each VPI/VCI of the call. However, since so many types of VPIs/VCIs are exchanged in the switching equipment, the table for allocating calls to bands becomes very large. In particular, when transmission speed becomes high, cells cannot be controlled corresponding to the transmission speed. In reality, when bands are controlled with buffers in the switching equipment, each buffer should be provided with a table that stores the relation between the VPIs/VCIs and allowable bands so as to compare the VPI/VCI of each cell with the VPI/VCI of the table. Thus, the construction for detecting and comparing the VPI/VCI becomes large and the process thereof becomes complicated.

As another method for solving such a problem, a plurality of switches are disposed in the switching equipment. Each service is allocated to each switch so as to prevent congestion of a path allocated to a particular service from adversely affecting other services. However, in this construction, the cost and size of the switching equipment increase. From this point of view, a path setting method that can prevent each service from adversely affecting other services, allow the quality of each service to be easily controlled, and use the existing switching equipment is required.

SUMMARY OF THE INVENTION

An object of the present invention is to solve the above-mentioned problem and provide a switching system for easily controlling the quality of each service of switching equipment.

The present invention is a switching path setting system used in switching equipment for exchanging a fixed length cell including a header field of routing information and an information field of data, comprising the following means. Input interface means for receiving a cell from an input line and for allocating a quality class to the cell corresponding to control information of the cell, the control information of the cell being for example VPI/VCI, the quality class being allocated by adding for example as tag information. Buffer means for determining the quality class of the cell allocated by the input interface means and for storing the cell corresponding to the quality class. Read control means for reading the cell from the buffer means corresponding to a predetermined parameter allocated to the quality class. Switch means for exchanging the cell being read under the control of the read control means. In the system, a cell is stored corresponding to a quality class of each service. A cell is read corresponding to a predetermined parameter allocated to each quality class. Thus, cell discard ratio is controlled for each service. Consequently, even if congestion takes place in a particular service, it does not adversely affect other services.

Although the above-mentioned construction is a switching path setting system on the input side of the switching equipment, the system may be disposed on the output side of the switching equipment. In addition, the switching path setting system may be disposed on each of the input side and the output side of the switching equipment.

BRIEF DESCRIPTION OF DRAWINGS

The above and other objects, features, and advantages of the invention will be better understood by reading the following more particulars of the invention, presented in conjunction with the following drawings.

FIG. 6 is a schematic diagram for explaining a table that stores the relation among VPIs/VCIs, declared bands, and quality classes;

DESCRIPTION OF THE PREFERRED EMBODIMENT

Next, with reference to the accompanying drawings, a preferred embodiment of the present invention will be described.

Figure 1:
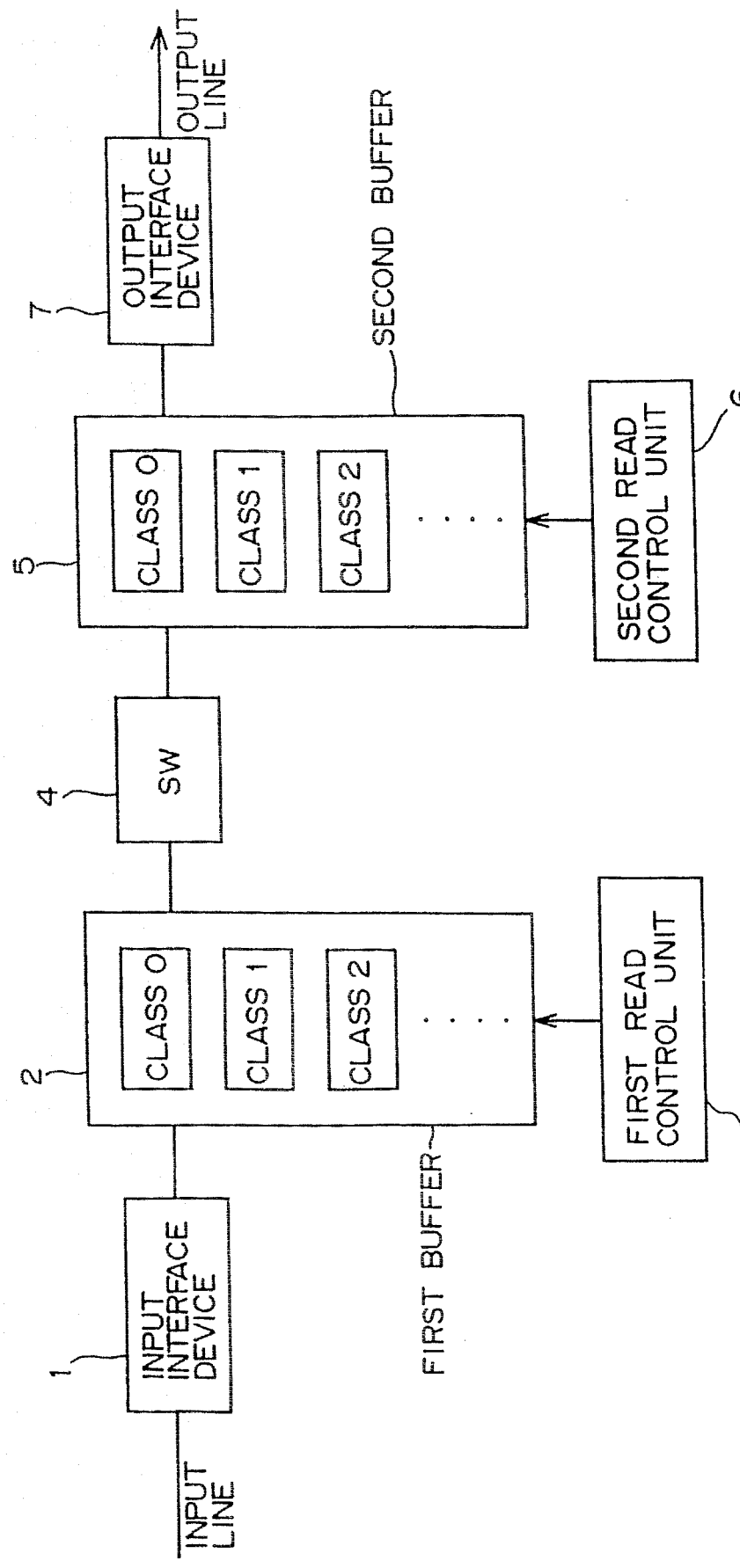
FIG. 1 is a block diagram for explaining the theory of the present invention.

FIG. 1 is a block diagram showing the theory of the present invention. When a switching path setting system is disposed on the input side of switching equipment, the system comprises an input interface device 1, a first buffer 2, and a first read control unit 3. An output cell is exchanged by switching equipment 4.

The input interface device 1 converts a line format of an input cell received from an input line into a switching equipment format. In addition, the input interface device 1 allocates a quality class to the cell in the switching equipment corresponding to control information of the cell. When the switching equipment 4 is ATM switching equipment, the control information is a VPI/VCI contained in the header of the cell. The quality class is added to the cell as tag information. The input interface device 1 is provided with a conversion table. The conversion table stores the relation between the control information (VPI/VCI) and quality class (tag information) of the input cell. When a call is set, the relation is written. With reference to the conversion table, the quality class is allocated to the input cell.

The first buffer 2 stores a cell in the switching equipment format corresponding to the quality class. At this point, the cell in the switching equipment format is stored in a FIFO (First In First Out) memory corresponding to each quality class.

The first read control unit 3 reads a cell for each quality class from the first buffer 2 corresponding to a predetermined parameter (for example, a read band; a read band is an allocated read out speed) that is allocated to each quality class. In addition, the first read control unit 3 reads a cell from the first buffer 2 so that the sum of the read bands for the quality classes becomes equal to or smaller than the band of the path of the switching equipment 4. The cell being read is exchanged by the switching equipment 4.

When the switching path setting system is disposed on the output side of the switching equipment 4, the system comprises a second buffer 5, a second read control unit 6, and an output interface device 7.

The second buffer 5 stores a cell that is output from the switching equipment 4 corresponding to a quality class allocated thereto. The second read control unit 6 reads a cell from the second buffer 5 corresponding to a predetermined parameter (for example, a read band) allocated to each quality class. The second read control unit 6 reads a cell in synchronization with a transmission clock of an output line. The output interface device 7 converts a switching equipment format of a cell read under the control of the second read control unit 6 into a line format and outputs the cell to the output line.

The switching path setting system may be disposed on each of the input side and the output side of the switching equipment 4. In this case, the system comprises the input interface device 1, the first buffer 2, the first read control unit 3, the second buffer 5, the second read control unit 6, and the output interface device 7.

Next, the operation of the switching path setting system shown in FIG. 1 will be described.

The input interface device 1 is provided with a conversion table that stores the relation between quality classes and control information. When a call is set, the content of the table is written corresponding to the service of the call. When the line format of the input cell is converted into the switching equipment format by the input interface device 1, the quality class is added to the input cell corresponding to the content of the conversion table. Thus, the quality class corresponding to the service of the cell can be added to the cell in the switching equipment format.

In such a manner, the switching path setting system causes the switching equipment to have a plurality of quality classes and allocates the services of calls to the quality classes.

The first buffer 2 stores a cell corresponding to the quality class (class 0, 1, 2, ... ). The first read control unit 3 reads a cell from the first buffer 2 corresponding to a parameter allocated to each quality class. When the cell read control is performed for each quality class, if the traffic of a particular service increases, cells corresponding to the quality class of the particular service are discarded. In other words, cells are independently discarded for each quality class.

When cells for each quality class are discarded in the switching equipment, it is equivalent to virtual quality class paths that are disposed in the switching equipment. Thus, even if cells for a service allocated to a particular quality class are discarded due to congestion or the like, services allocated to other quality classes are not adversely affected.

The first read control unit 3 causes the sum of the read bands allocated to the quality classes to be equal to or smaller than the band of the path of the switching equipment 4. Thus, the sum of the bands of the cells that are input to the switching equipment 4 does not exceed the band of the path of the switching equipment 4. Consequently, at the cross-point of the switching equipment 4, cells are not discarded. Even if the traffic of cell transmission increases, cells are not discarded in the switching equipment 4. Instead, cells are discarded in the first buffer 2. Thus, the input interface device 1, the first buffer 2, and the first read control unit 3 can perform the quality control for each service.

A cell exchanged by the switching equipment 4 is stored in the second buffer 5 corresponding to the quality class thereof. The cell is read from the second buffer 5 under the control of the second read control unit 6. At this point, even if the band of a particular quality class increases and thereby cells are discarded in the second buffer 5, since the cells are discarded for each quality class, congestion of the service of a particular class does not adversely affect other services.

Since the second read control unit 6 reads a cell in synchronization with a transmission clock of each output line, when the cell is transmitted to an output line, it is not discarded. Thus, even if the traffic of the cell transmission increases, cells are discarded in the second buffer 5 for each quality class. Consequently, the second buffer 5, the second read control unit 6, and the output interface device 7 can perform the quality control for each service.

The switching path setting system shown in FIG. 1 provides a plurality of quality classes for the switching equipment, allocates services of cells to the quality classes, and independently performs the quality control for the quality classes, thereby accomplishing virtual quality class paths in the switching equipment. In addition, since the switching path setting system performs the quality control for each quality class path, the quality control of services allocated to the quality classes are independently performed.

The switching path setting system in ATM switching equipment is explained as one example of a switching path setting system in the present invention.

Figure 2:
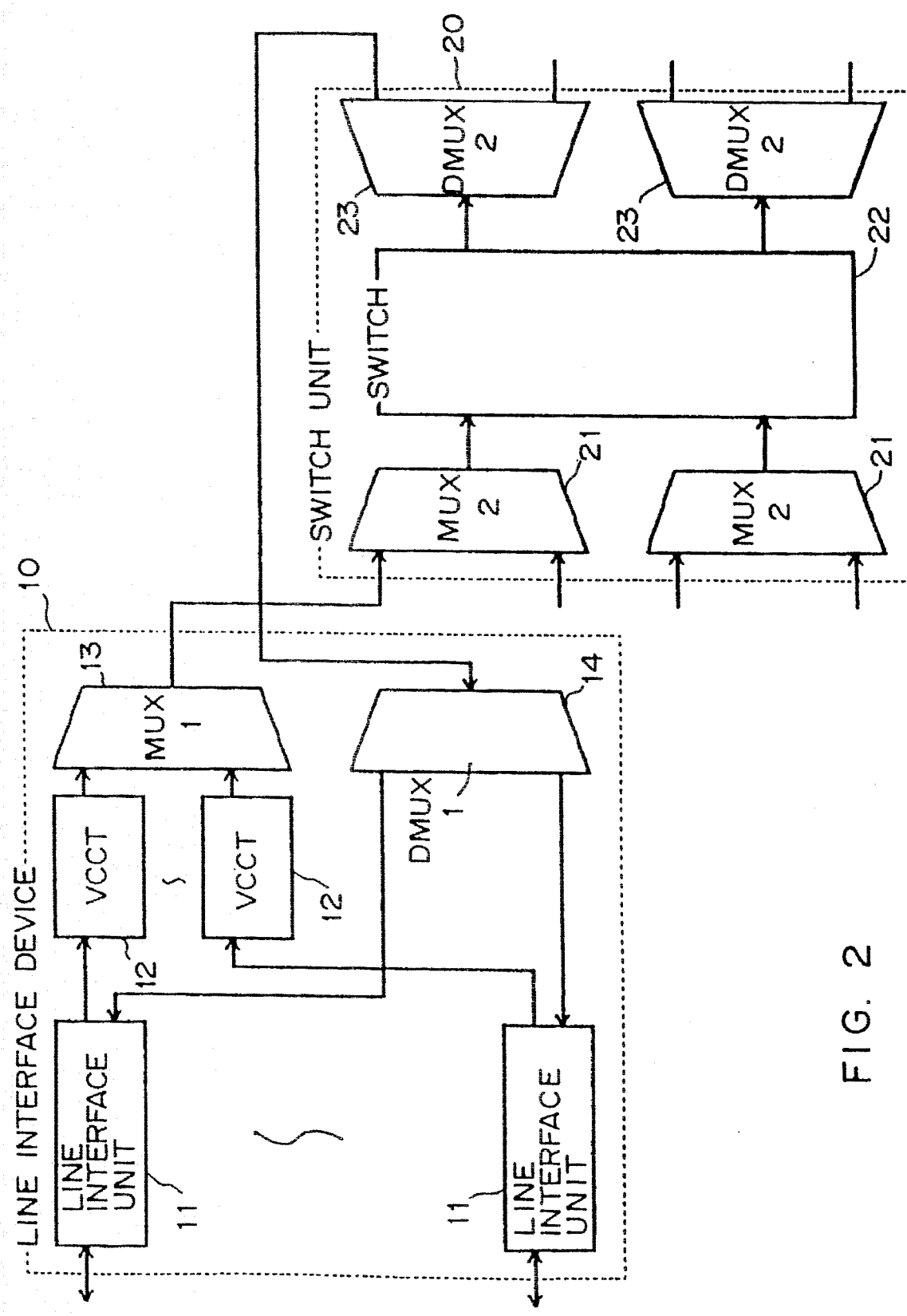
FIG. 2 is a block diagram showing the construction of an ATM switching equipment according to an embodiment of the present invention.

FIG. 2 is a block diagram for explaining the overall construction of ATM switching equipment according to an embodiment of the present invention. Referring to FIG. 2, the ATM switching equipment comprises a line interface device 10 and a switch unit 20. The line interface device 10 accommodates 16 lines. The ATM switching equipment exchanges cells at high speed (at 2.4 Gbps) and performs multiplexing and demultiplexing operations at two levels so as to accomplish large capacity, small size construction.

The line interface device 10 comprises a line interface unit 11 that terminates a line. The line interface unit 11 receives a cell from the line and converts a line format of the cell into a switching equipment format corresponding to the content written in a VCI conversion table 12 (VCCT). At this point, the line interface unit 11 adds routing information for the switching equipment and information for the quality class of the switching equipment to the beginning of the cell. The information is added as tag information.

The VCI conversion table (VCCT) 12 is constructed of a memory such as an RAM and stores VPIs/VCIs for output cells and tag information corresponding to the VPIs/VCIs of input cells. When a call is set, this relation is written.

A multiplexer (MUX1) 13 multiplexes cells that are output from each of the line interface units 11. In this example, the multiplexer (MUX1) 13 multiplexes cells that are output from 16 line interface units 11 and outputs the multiplexed data to the switch unit 20.

A multiplexer (MUX2) 21 multiplexes cells transmitted from the line interface devices 10 and outputs the multiplexed data to a switch 22.

The switch 22 is a self-routing switch. The hardware of the switch 22 autonomously selects a route from an input terminal to an output terminal corresponding to the tag information at the beginning of a cell and exchanges the cell at high speed. The tag information has been added to the cell by the line interface device 10 using the VCI conversion table 12.

A demultiplexer (DMUX2) 23 and a demultiplexer (DMUX1) 14 output a cell received from the switch 22 to respective output lines corresponding to the tag information added to the cell. The cell output from the demultiplexer 14 is sent to the line interface unit 11. The line interface unit 11 converts the switching equipment format of the cell into the line format. The cell in the line format is output to an output line.

Figure 3:
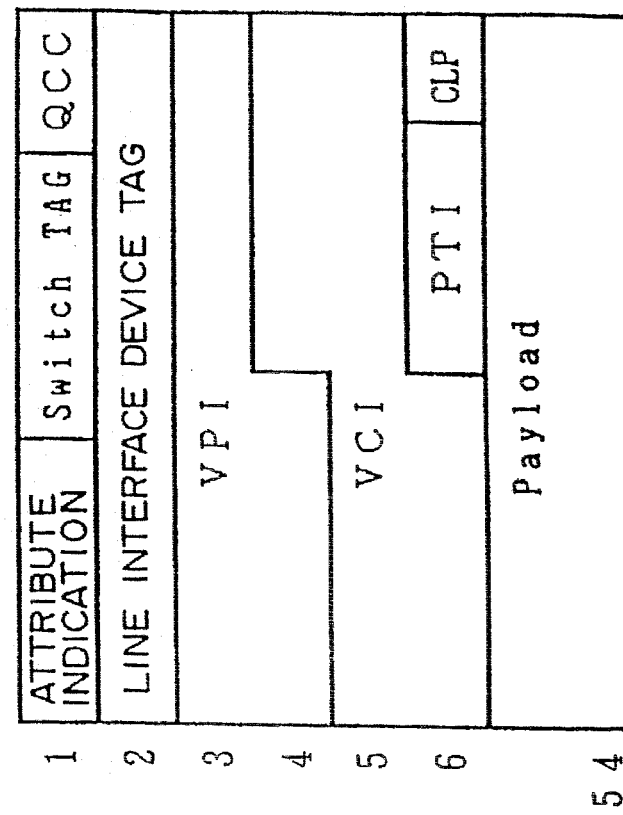
FIG. 3A is a schematic diagram showing a line format of an ATM cell.
FIG. 3B is a schematic diagram showing a switching equipment format of an ATM cell according to the present invention.

Next, with reference to FIGS. 3A and 3B, the line format and the switching equipment format will be described.

FIG. 3A is a schematic diagram showing the line format of a cell. As shown in FIG. 3A, the first 12-bit unit of a cell in the line format is a VPI. The VPI is followed by a 16-bit VCI. The VCI is followed by a 3-bit PTI that represents a payload type (user information, control information, or the like). The PTI is followed by a CLP (one bit) that represents cell loss priority. The CLP is followed by an 8-bit HEC that is used for detecting an error of the header unit and for cell synchronization. The HEC is followed by a 48-byte payload. A cell is transmitted in serial format on a line.

The VPI/VCI is set in the following manner. When a call is set, the calling subscriber notifies information including the called subscriber, declared band, and service type to the switching equipment. The switching equipment determines whether a path can be set corresponding to the notified information. When a path can be set, the switching equipment determines the VPI/VCI and sends them to the calling subscriber. The data between the calling subscriber and the called subscriber is exchanged using the VPI/VCI. At this point, information concerning the VPI/VCI is written to the VCI conversion table 12.

Figure 4:
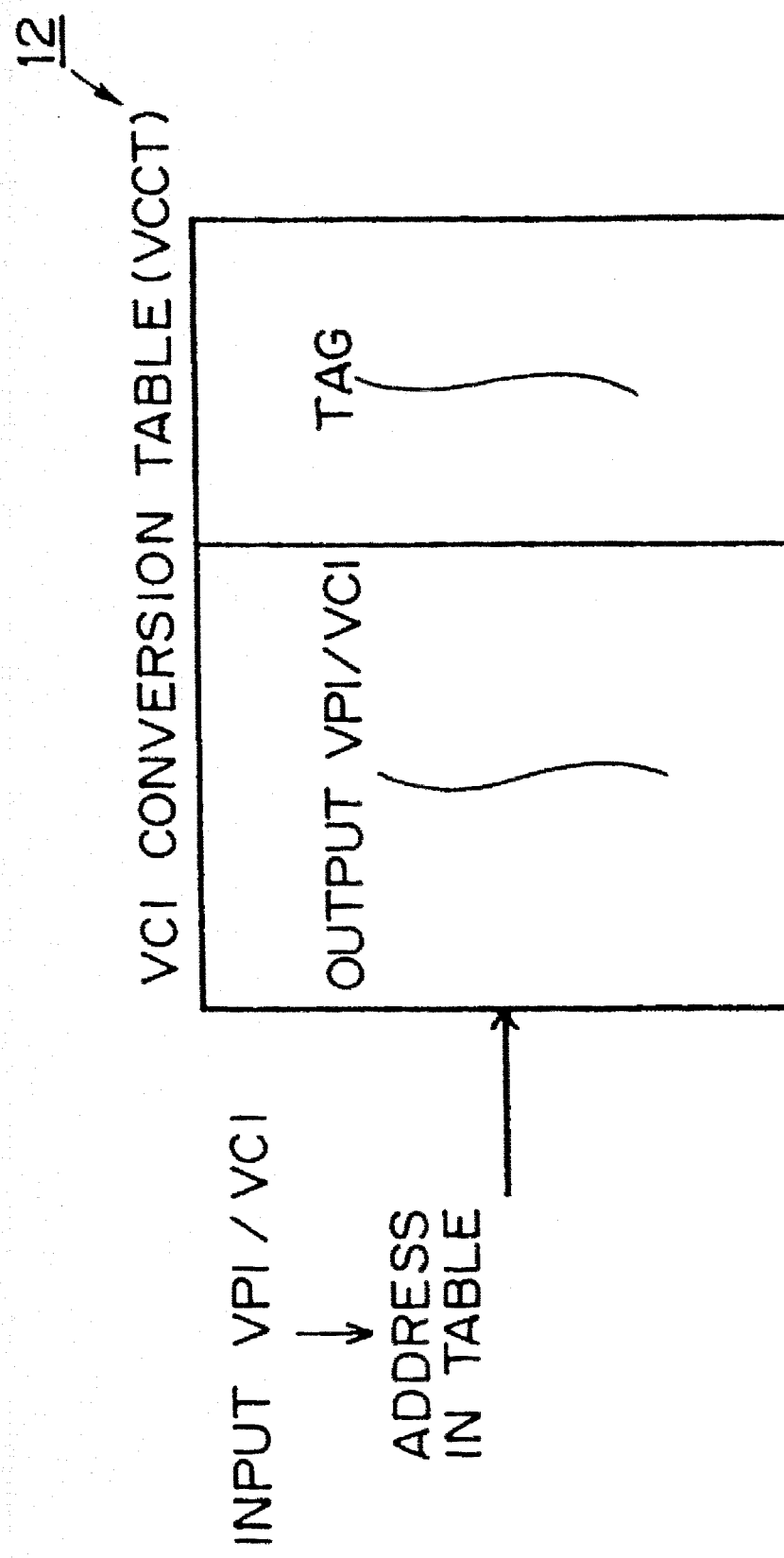
FIG. 4 is a schematic diagram showing a VCI conversion table.

FIG. 4 is a schematic diagram showing the VCI conversion table 12. The VCI conversion table 12 stores VPIs/VCIs of output cells and tag information added to the cells in the switching equipment. When a call is set, such information is written to an address of the VPI/VCI determined by the switching equipment based on information including called subscriber, declared band, and service type notified by the calling subscriber. Thus, when the line interface device 10 detects the VPI/VCI of an input cell, the output VPI/VCI and tag information to be allocated to the cell can be obtained.

FIG. 3B is a schematic diagram showing the switching equipment format of a cell. As shown in FIG. 3B, 2-byte tag information is added to the beginning of a cell in the switching equipment format. The tag information is followed by a VPI, a VCI, a PTI, a CLP, and a payload.

The tag information is read from the VCI conversion table 12. A first 3-bit unit of the tag information is an attribute indication tag. The first bit of the attribute indication tag is a bit where the CLP is copied. The second bit of the attribute indication tag is a bit that represents whether or not the cell is a test cell. The third bit of the attribute indication tag is a bit that represents whether the communication is a "point to point" communication or a "point to multi points" communication. The attribute indication tag is followed by a switch tag. The switch tag is 3-bit information. The switch tag determines the route in the switch 22 that the cell passes through.

The switch tag is followed by a QCC tag that is two-bit information. The QCC tag represents a quality class. In this embodiment, the QCC tag sets four classes (classes 0 to 3). If the construction of the tag information is modified and three bits are allocated to the QCC tag, eight quality classes can be set. In this embodiment, the quality class is determined corresponding to an allowable value of cell loss ratio (cell discard ratio). Instead, quality classes may be set corresponding to cell transmission delay time.

The quality classes correspond to service types. In other words, the quality (cell loss ratio) of a service requested by a subscriber depends on the service type such as image data, voice data, and LAN data. The relationship between quality classes and services requested by subscribers are pre-determined in the ATM network. In other words, it is predetermined which quality classes each service type corresponds to. When a call is set and a service requested by a subscriber is notified to the switching equipment, the quality class allocated to the service is detected and the content of the QCC tag that represents the quality class is written in the VCI conversion table 12. In such a manner, each service is allocated to one of the quality classes 0 to 3. In this embodiment, the relation between the service types and the quality classes is predetermined in the ATM network, however, the subscriber may allocate any quality class to a service on setting a call in another configuration of the present invention.

The QCC tag is followed by the 8-bit line interface device tag that represents an output line of the demultiplexer 23 or the demultiplexer 14. The line interface device tag is followed by the VPI/VCI. The VPI/VCI is rewritten corresponding to the VCI conversion table 12. The PTI and CLP are the same as those of a cell in the line format. The header is followed by the payload. In the switching equipment, cells are processed in parallel. Thus, cells are transmitted in parallel format of for example eight bits. With horizontal parity, the normality of the cell data is verified.

Next, with reference to FIGS. 5 to 7, the setting of quality class paths will be described.

Figure 5:
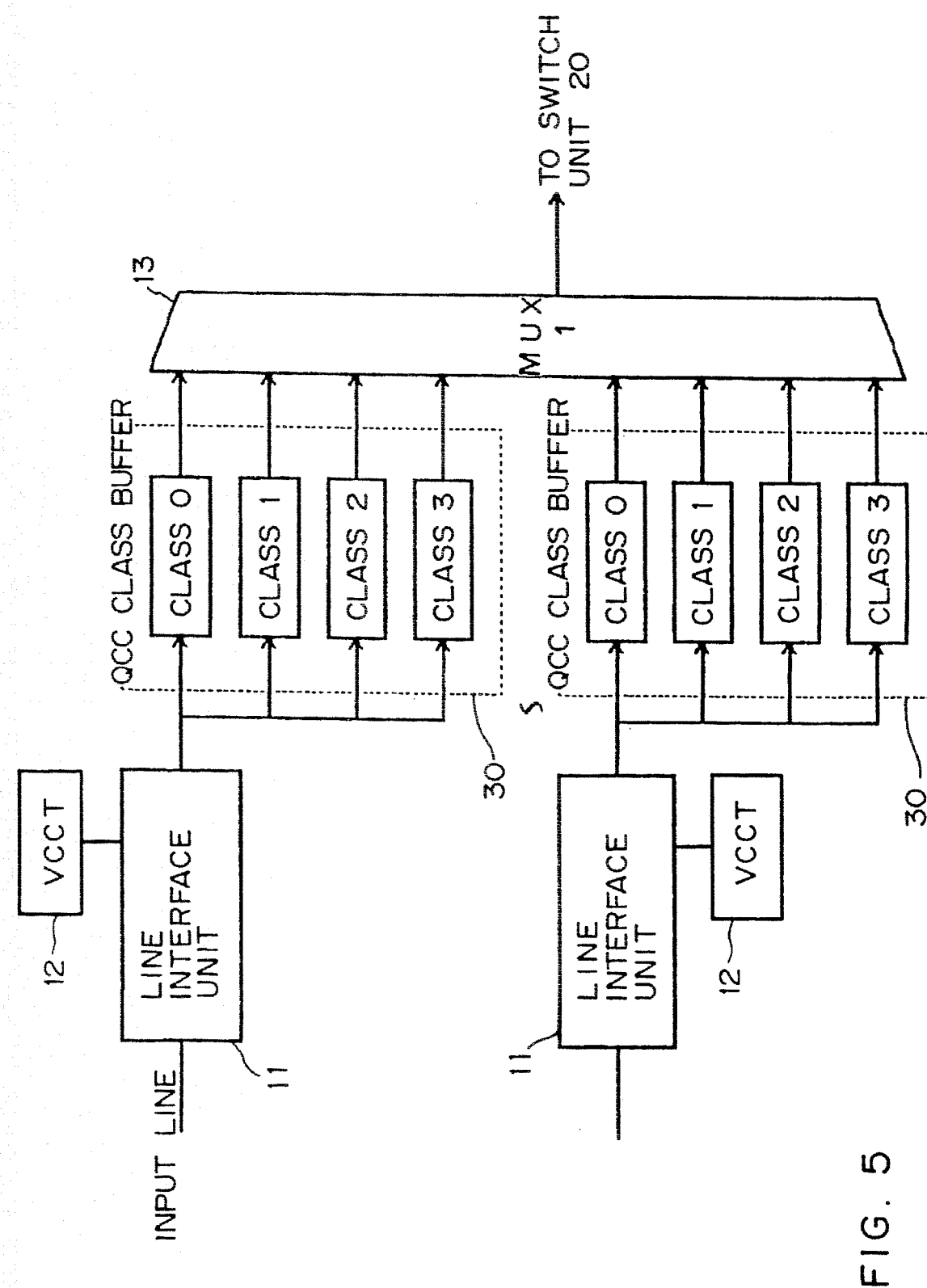
FIG. 5 is a block diagram showing a circuit that sets a quality class path and that is disposed between an input line and switching equipment.

FIG. 5 is a block diagram showing a QCC class buffer and peripheral units thereof that are disposed between an input line and a switch and that set a quality class path. In the example shown in FIG. 5, the QCC class buffer 30 is disposed just upstream of the multiplexer 13 in the line interface unit 11. Instead, the QCC class buffer 30 may be disposed in the switch unit 20.

When the line interface unit 11 receives a cell from a input line, it converts a line format into a switching equipment format corresponding to the VCI conversion table 12. At this point, as described above, the QCC tag, which represents the quality class of the cell, is added to the cell.

The quality class of the cell in the switching equipment format is detected by the QCC tag. The quality class detecting process of the cell using the tag information is performed by hardware at high speed. The cell is written to the QCC class buffer 30 corresponding to the quality class thereof.

The QCC buffer 30 may be constructed of four independent buffers. In this case, the four buffers are constructed of FIFOs to which the quality classes 0 to 3 are allocated. The QCC class buffer 30 may be constructed of a common buffer as will be described later.

Cells are read from the QCC class buffer 30 for each quality class. The read control is performed in such a manner that a predetermined read band is allocated to each quality class and cells for each quality class are read corresponding to the read band.

When a cell of the quality class 0 is input to the switching equipment, the cell is written to the QCC class buffer 30 corresponding to the quality class (writing a cell to a buffer of quality class 0) and read at a band allocated to the quality class 0. Thus, when the read band from which a cell is read is larger than the write band (writing speed) of the buffer for the quality class 0, since the buffer for the quality class 0 does not get overflowed, the cell is not discarded. However, when the write band of the buffer for the quality class 0 becomes larger than the read band, since the buffer for the quality class 0 gets overflowed, the cell is discarded. Such cell discarding will take place when a burst-like data that exceeds the declared band is input to the switching equipment.

To prevent such cells from being discarded, a satisfactorily large read band may be allocated to each quality class. However, the read band has the following restriction. The sum of the read bands allocated to each quality class should be equal to (or smaller than) the band of the path in the switch 22 so as to prevent cells from being discarded at each cross-point in the switch 22.

Thus, when satisfactorily large bands cannot be allocated to all the quality classes, cells may be discarded in one of the quality classes 0 to 3. However, since cells are written to and read from the QCC class buffer 30 independently for each quality class, cells discarded in one quality class do not adversely affect cells in other quality classes. In other words, even if the traffic of a particular service increases and cells are discarded in the buffer for the quality class of the service due to congestion, the congestion does not cause cells in buffers for other quality classes to be discarded. Thus, quality in other quality classes is not deteriorated. It is equivalent to virtual quality class paths that are disposed in the switching equipment.

Read bands are allocated to the quality classes 0 to 3. These read bands determine the quality (cell discard ratio) of the quality classes. When the quality request of a service allocated to the quality class 0 is strict and cell loss is not permitted, the read band of the quality class 0 should be satisfactorily larger than the predicted writing speed of the quality class 0. In this case, the buffer for the quality class 0 always has a margin (writable region). Thus, even if a burst-like data of the service for the quality class 0 is input, the buffer for the quality class 0 does not get overflowed and thereby cells are not discarded.

Thus, the quality of each quality class depends on the relation between the writing speed to the buffer for the corresponding quality class and the read band. However, the writing speed (band) is declared when a call is set. The declared band is totally controlled by software called Connection Admission Control (CAC) corresponding to all VPIs/VCIs that are currently connected. FIG. 6 shows an example of a table controlled by the connection admission control software. When a call is set, a declared band and a quality class for each VPI/VCI are written. Thus, the switching equipment can obtain the sum of the declared bands for each quality class corresponding to the table.

The switching equipment controls the relation (for example, a predetermined ratio) between the sum of the declared bands and the read bands for each quality class. For example, for a quality class where the request for the cell loss ratio is strict, the switching equipment allocates a read band that is satisfactorily larger than the sum of the declared bands for the corresponding quality class. Thus, the read band allocated to each quality class varies whenever a call is set. In this embodiment, the read band is obtained in the above-mentioned manner. However, the read band may be fixedly allocated corresponding to the prediction of the usage of each service.

The quality of the quality classes 0 to 3 is defined as for example cell loss ratio. The cell loss ratio can be calculated by a simulation of the relation between the declared band and the read band and the capacity of the buffer for each quality class. In other words, when the capacity of the buffer for each quality class is known, since the declared band for each quality class is controlled by the connection admission control software, the read band that satisfies any cell loss ratio can be determined for each quality class.

Figure 7:
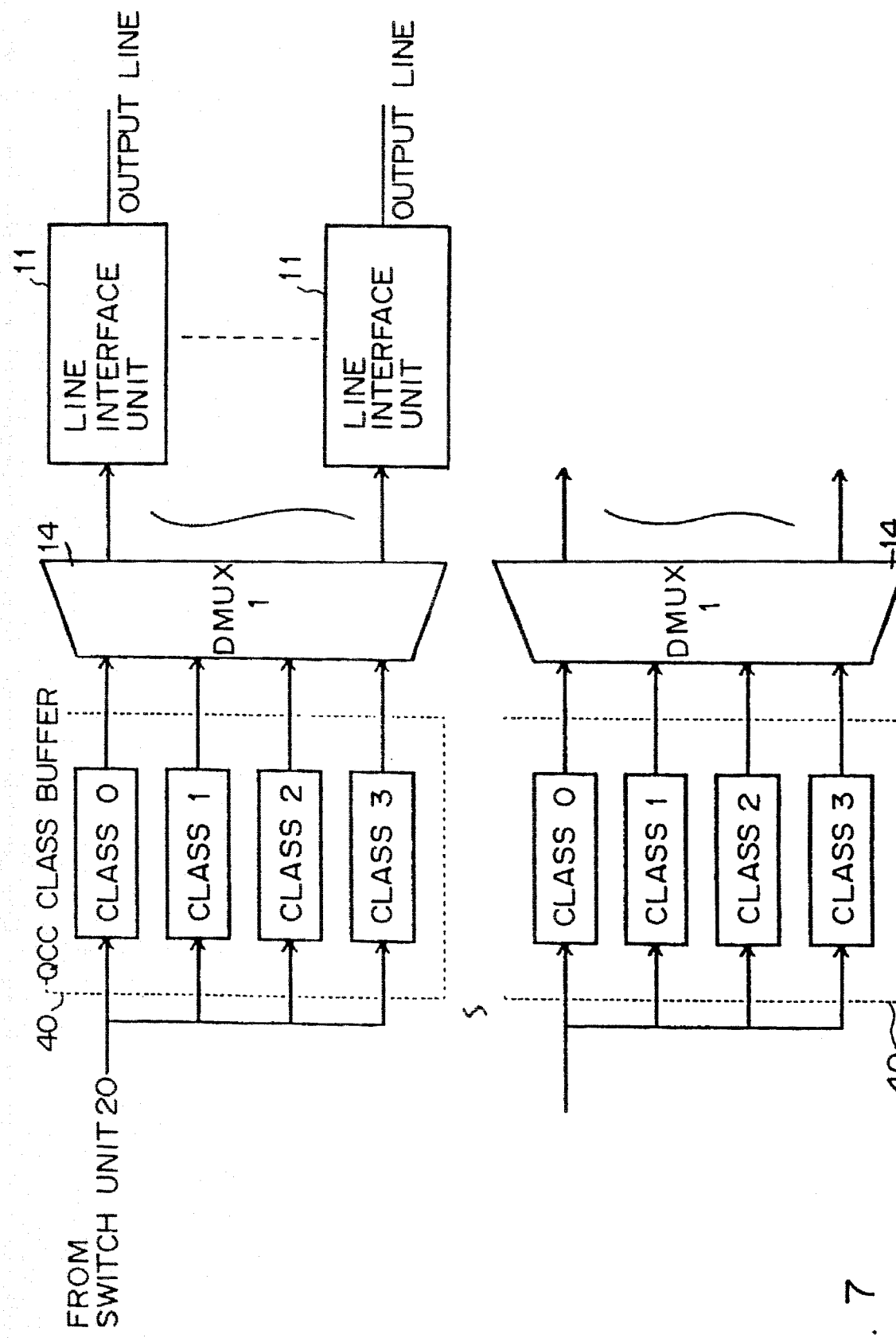
FIG. 7 is a block diagram showing a circuit that sets a quality class path and that is disposed between switching equipment and an output line.

FIG. 7 is a block diagram showing a QCC class buffer and peripheral units thereof that are disposed between the switching equipment and an output line and that set a quality class path. In the example shown in FIG. 7, the QCC class buffer 40 is disposed just upstream of a demultiplexer 14 in a line interface device 10. Instead, the QCC class buffer 40 may be disposed in a switch unit 20.

The construction and write/read control of the QCC class buffer 40 are substantially the same as those of the QCC class buffer 30 shown in FIG. 5. In other words, a cell that is output from the switch 22 is stored in the QCC class buffer 40 corresponding to the QC tag that represents the quality class. For reading cells from the QCC class buffer 40, predetermined read bands are allocated to quality classes. The cells are read based on the read bands corresponding to the respective quality classes and output to a demultiplexer 14. The demultiplexer 14 outputs cells to line interface units corresponding to line interface device tags of the cells. The line interface units 11 output cells to corresponding lines.

Cells are read from the QCC class buffer 40 in synchronization with clocks (transmission clocks of output lines) corresponding to services of output lines terminated by the line interface units 11. The line interface device 10 has 16 line interface units 11. The read clock is switched successively from a clock of an output line terminated by the first line interface unit 11 at a clock of an output line terminated by the 16th line interface unit 11. Thus, when the bands of the output lines terminated by each line interface unit 11 differ from each other, the cell read clock received from the QCC class buffer 40 varies corresponding to each line interface unit 11. The band of the clock of the output line terminated by each line interface unit 11 is divided into read bands for the quality classes 0 to 3 with a predetermined dividing ratio. Cells are read based on the read bands corresponding to the respective quality classes. The bands of the clocks are totally controlled by the connection admission control software.

When the read bands of the QCC class buffer 40 are allocated in such a manner, if the band of cells that are output from the switch 22 to a particular output line becomes larger than the band of the transmission clock of the line, the write speed for the QCC class buffer 40 for the corresponding quality class becomes higher than the read speed. Thus, cells are discarded in the QCC class buffer 40. Consequently, cells are not discarded in the line interface unit 11 or on the output line. In addition, since cells are discarded in the QCC class buffer independently for each quality class, even if the traffic of the service allocated to a particular quality class increases and cells are discarded in the quality class due to congestion, this congestion does not adversely affect other quality classes. In this case, since cells are discarded only in the QCC class buffer 40, cells that are read from the QCC class buffer 40 are not discarded, but transmitted to the called subscriber through a corresponding output line.

As described above, according to the switching equipment of this embodiment, the quality class buffers are disposed in the multiplex unit on the input side of the switch 22 and in the demultiplex unit on the output side of the switch 22. Cells are written to and read from these quality class buffers for each quality class. If a buffer allocated to a particular quality class gets overflowed or if the data amount of cells stored in the buffer exceeds a predetermined threshold value thereof, cells of the quality class are discarded. However, cells of other quality classes are not discarded. When the buffer for the quality class 0 gets overflowed, some of the cells of the quality class 0 are discarded. However, cells of the quality classes 1, 2, and 3 are not discarded. Thus, the quality of the services of the quality classes 1, 2, and 3 is not deteriorated.

Consequently, when a predetermined quality (cell loss ratio) is allocated to each quality class, the transmission quality of cells can be controlled for each quality class. As a result, the quality of services can be controlled so that the quality of cell discard ratio required for each service can be satisfied.

If the amount of data that is input to the switching equipment increases in burst-like manner, since the quality class buffer discards cells, the switch unit can prevent cells from being discarded. Thus, the quality of each service can be controlled without the need to provide a special means to the construction of the switch unit. In other words, since the quality control does not depend on the construction of the switch, even if several switch units are connected in series so as to increase the capacity, it is not necessary to provide special means to the switch units.

Moreover, in this system, tag information, which represents a quality class, is added to each cell. With the tag information, the quality of cells is controlled. The tag information is processed by hardware. Since the number of quality classes is much smaller than the number of VPIs/VCIs processed by the switching equipment, the QCC class buffer unit can control the quality classes easily at high speed. Thus, a large table that stores the relation between VPIs/VCIs and allowable bands is not required. In addition, the band control does not need to compare VPIs/VCIs.

Next, with reference to FIG. 8, the practical construction of the quality class buffer and the peripheral units in the multiplex unit will be described.

In this embodiment, the line interface device 10 accommodates 16 lines. These lines are referred to as lines 0 to 15. For each line, a common buffer 31, a quality class detecting circuit 32, an address FIFO 33, and a read control circuit 34 are provided.

A cell received from the line 0 is supplied to an input interface unit (not shown) that terminates the line 0. This input interface unit is equivalent to the line interface unit 11 shown in FIG. 5. The line interface unit converts the format of the input cell in such a manner that a QCC tag that represents a quality class (service type) is added to the cell. This format conversion is the same as that described in FIG. 3. The resultant cell is written to a common buffer 31-0. At this point, a quality class detecting circuit 32-0 detects the QCC tag of the cell and determines the quality class thereof.

An address FIFO 33-0 is a FIFO memory that has independent FIFOs corresponding to quality classes. Thus, the address FIFO 33-0 has FIFOs for the classes 0 to 3. The address FIFO 33-0 stores the start address of a cell written in common buffer 31-0 for each quality class. For example, when the quality class determined by the quality class detecting circuit 32-0 is the class 0, the start address of the cell stored in the common buffer 31-0 is written to the FIFO for the class 0 of the address FIFO 33-0. At this point, the quality class detecting circuit 32-0 notifies the class number "0" to a sequence control circuit 35.

The above-mentioned construction applies to the lines 0 to 15. Whenever cells are input from these lines, the cell data is written to the common buffers 31-0 to 31-15. The write addresses of the cell data are written to the address FIFOs 33-0 to 33-15 for each quality class. The quality class detecting circuits 32-0 to 32-15 notify the class numbers 0 to 3 to the sequence control circuit 35.

When the sequence control circuit 35 receives class numbers from the quality class detecting circuits 32-0 to 32-15, it writes the line numbers of the quality class detecting circuits 32-0 to 32-15, which sent the class numbers, to a line allocating FIFO 36. The line allocating FIFO 36 is constructed of four FIFOs corresponding to the classes 0 to 3. The sequence control circuit 35 writes the line numbers of the quality class detecting circuits 32-0 to 32-15, which sent the class numbers, to the FIFOs corresponding to the received class numbers. For example, after the class number "0" was received from the quality class detecting circuit 32-0, when the class number "0" is received from the quality class detecting circuit 32-1, the sequence control circuit 35 writes the line number "0" to the FIFO for the class 0 of the line allocating FIFO 36 and stores the line number "1" to the FIFO for the class 0. If the sequence control circuit 35 receives the same class numbers at the same time, it determines that the lower line number has higher priority and writes this line number to the line allocating FIFO 36.

Figure 9:
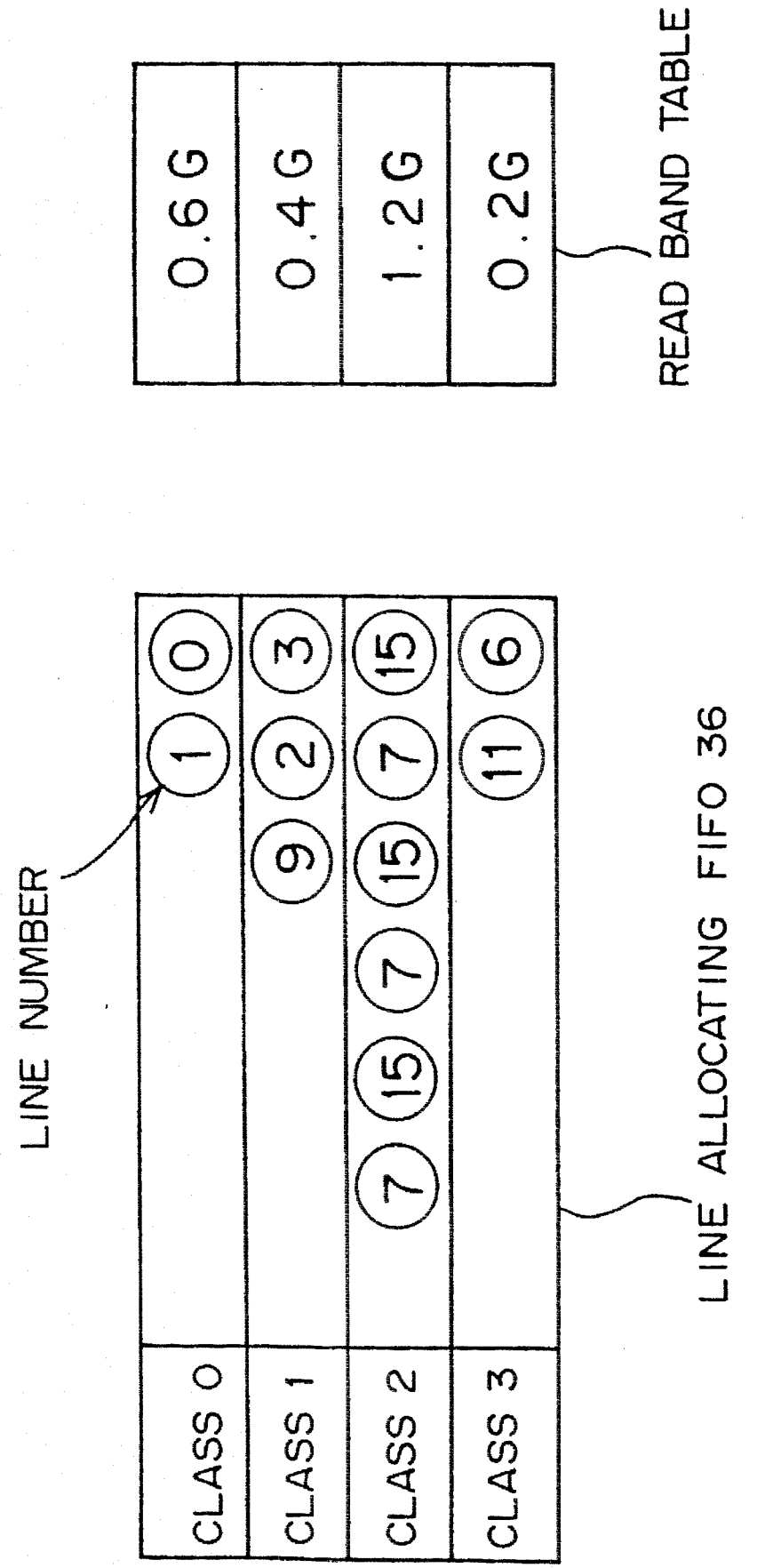
FIG. 9 is a schematic diagram for explaining the conception of the control of a line allocating FIFO.

The line numbers read from the line allocating FIFO 36 are controlled corresponding to read bands allocated to the quality classes. Next, an example of the read control will be described with reference to FIG. 9. In this example, for simplicity, it is assumed that read bands of 0.6 Gbps, 0.4 Gbps, 1.2 Gbps, and 0.2 Gbps are allocated to the read bands for the quality classes 0 to 3 respectively. The sum of the read bands is 2.4 Gbps, which is equivalent to the band of the path of switch 22.

The read band for each quality class is stored in a read band table. In the example shown in FIG. 9, for the simplicity, the read bands stored in the read band table are fixed values. However, whenever a call is set, the read bands may be rewritten. For example, the band for each quality class is calculated by the connection admission control software corresponding to the band declared when each call is set. The sum of the read bands of each quality class is limited to for example 2.4 Gbps.

The ratio of the band for each quality class and the read band is controlled to a predetermined value. Alternatively, the relation between the declared band for each quality class and the read band is calculated by a simulation or the like and stored in a table. Whenever a call is set, the read band is retrieved from the table.

A read control signal that causes a line number to be read from the line allocating FIFO 36 is output corresponding to the content of the read band table. The number of line numbers read from each quality class FIFO in a predetermined period is the same as the ratio of the read band stored in the read band table. In the example shown in FIG. 9, the numbers of line numbers read from the FIFOs for the classes 0 to 3 in the predetermined period are 3, 2, 6, and 1, respectively.

When a line number is read from the line allocating FIFO 36, a class number of a quality class FIFO that stores the line number is transmitted to a read control circuit 34 corresponding to the line number. For example, if the line number "0" stored at the beginning of the FIFO for the class 0 of the line allocating FIFO 36 is read out, the class number "0" is transmitted to the control circuit 34-0.

When the control circuit 34-0 receives the class number "0" it reads the address data stored at the beginning of the FIFO for the class 0 of the address FIFO 33-0. The control circuit 34-0 reads the cell data stored at the address of the common buffer 31-0 and outputs it to the multiplexer 13-0.

The multiplexers 13-0 to 13-15 are connected in a daisy chain. Output data of the multiplexers 13-0 to 13-15 is finally output from the multiplexer with the largest line number (in this case, the multiplexer 13-15). When the line interface device 10 accommodates eight lines, by transmitting the output data of the multiplexer 13-7 to the switch unit 20, the construction can be flexibly changed.

In this embodiment, since the sum of the read bands allocated to the quality classes 0 to 3 are 2.4 Gbps, the band of cells that are multiplexed by the multiplexers 13-0 to 13-15 and output to the switch 22 is 2.4 Gbps. Since this band is equivalent to the band of the path in the switch 22, cells that are output from the multiplexer 13-15 are not discarded in the switch 22.

When cells that are input from the lines 0 to 15 increase in a burst-like manner, the address FIFOs 33-0 to 33-15 may get overflowed. Next, a case where cells of the quality class 0 are input to the line 0 in a burst-like manner will be described.

When a cell of the quality class 0 is input from the line 0, the cell is written to the common buffer 31-0 and a write address of the common buffer 31-0 is stored in the FIFO for the class 0 of the address FIFO 33-0. The read control of the FIFO for the class 0 of the address FIFO 33-0 is performed corresponding to the band data of the read band table. At this point, if the input cells increase in a burst-like manner and the write speed to the FIFO for the class 0 of the address FIFO 33-0 becomes larger than the read band, the buffer will get overflowed. In this case, however, the FIFOs for the classes 1 to 3 of the address FIFO 33-0 will not get overflowed. When the FIFO for the class 0 gets overflowed, if cells of the quality class 0 are input from the line 0, the cells are not written to the common buffer 31-0, but are discarded. In this case, the quality class detecting circuit 32-0 does not notify the class number "0" to the sequence control circuit 35.

As an example of the cell discard process, a buffer that can store one cell is disposed on the input side of the common buffer 31-1. While the buffer is storing the cell, the address FIFO 33-0 determines whether or not the FIFO for the quality class of the cell has a margin (or whether or not the FIFO exceeds a predetermined threshold value). When the FIFO has a margin, the cell is written to the common buffer 31-0. Otherwise, the cell is discarded.

However, if cells are input in a burst-like manner, the line allocating FIFO 36 may get overflowed. The FIFOs for the quality classes of the line allocating FIFO 36 have respective storage capacity. If data for a particular quality class abruptly increases, line numbers are stored in the FIFOs corresponding to the quality classes. When the amount of data stored in each FIFO exceeds its capacity, the FIFO gets overflowed. Thus, the data of the line number is discarded. For example, when cells of the quality class 0 are instantaneously input, the FIFO for the quality class 0 of the line allocating FIFO 36 gets overflowed. Thus, the data of the line number stored in the FIFO for the class 0 is discarded. The information concerning the data discard is notified to the read control circuits 34-0 to 34-15. For example, when data of the line number "2" is discarded in the FIFO for the class 0, this data discard is notified to the read control circuit 34-2. The read control circuit 34-2 discards cells of the quality class 0. At this point, the FIFOs for the classes 1 to 3 of the line allocating FIFO 36 do not get overflowed. Thus, cells of the quality classes 1 to 3 on the lines 0 to 15 are not discarded. In other words, some of the cells of the service allocated to the quality class 0 are discarded. However, the data discard does not affect the services allocated to the quality classes 1 to 3. Thus, the quality of these quality classes is not deteriorated.

Figure 10:
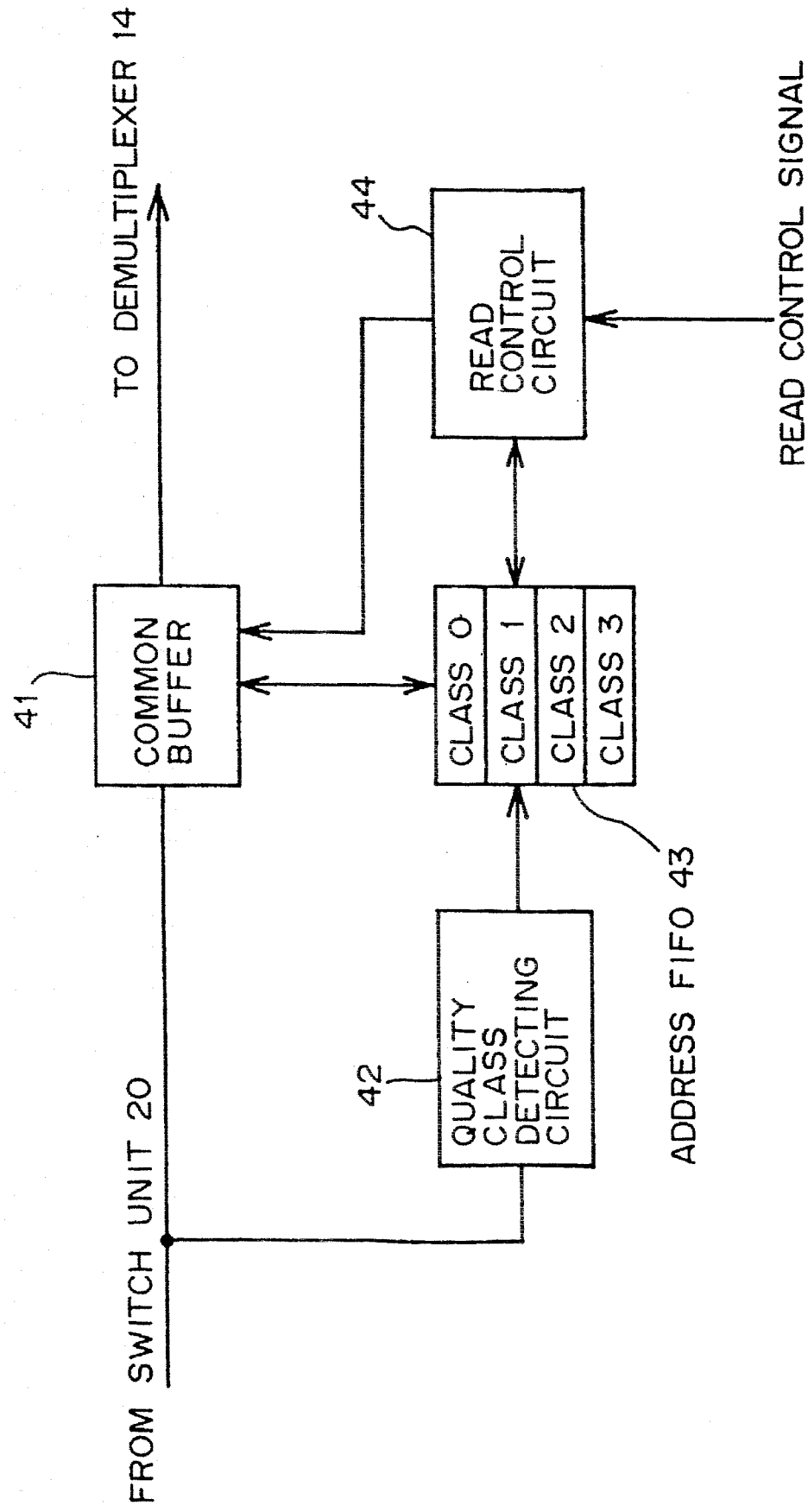
FIG. 10 is a practical block diagram showing a quality class path setting circuit of a demultiplex unit of FIG. 7.

FIG. 10 is a block diagram showing a concrete configuration of a quality class buffer and peripheral units thereof in the demultiplex unit.

Figure 8:
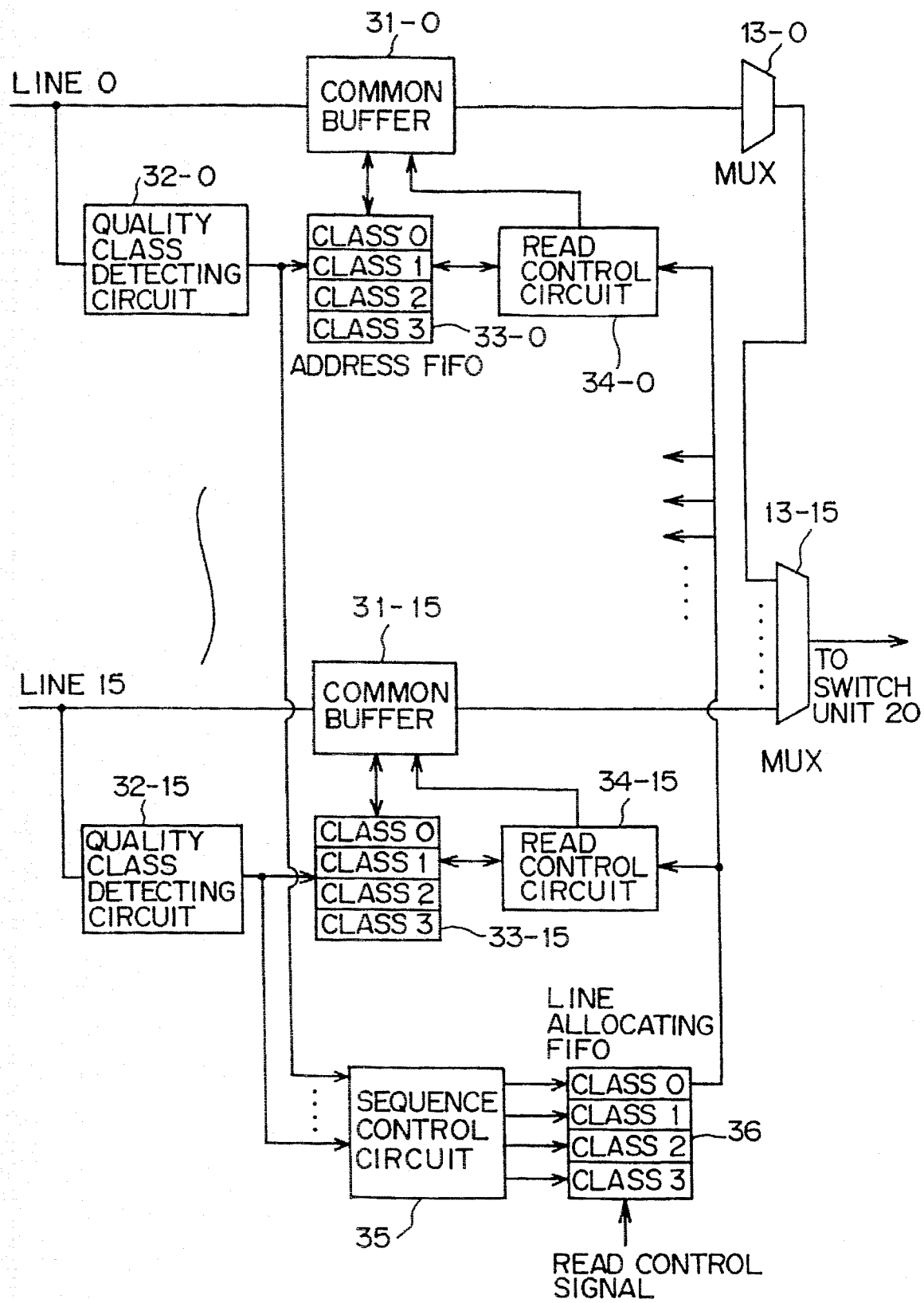
FIG. 8 is a detailed block diagram showing a quality class path setting circuit of a multiplex unit of FIG. 5.

The configuration shown in FIG. 10 is substantially the same as the configuration of one line shown in FIG. 8. In other words, the quality class of a cell received from a switch unit 20 is determined by a quality class detecting circuit 42 corresponding to a QCC tag. The cell is written to a common buffer 41. The write address of the common buffer 41 is stored in an FIFO corresponding to the class of the address FIFO 43. A read control circuit 44 reads the cell data from common buffer 41 and transmits it to a demultiplexer 14 corresponding to a band allocated to the quality class.

Next, with reference to FIG. 11, another embodiment of the circuits shown in FIG. 5 or 7 will be described. In this embodiment, for simplicity, it is assumed that there are two quality classes.

Reference numeral 51 is a cell filter that separates input cells corresponding to their quality classes. The cell filter 51 comprises a class 1 pass filter 51-1 and a class 2 pass filter 51-2. The cell filter 51 causes input cells to pass or not to pass corresponding to their quality classes. A cell that passes through the class 1 pass filter 51-1 is written to a class 1 buffer memory 52-1. A cell that passes through the class 2 pass filter 51-2 is written to a class 2 buffer memory 52-2. These buffer memories 521 and 52-2 are FIFO memories.

The buffer memories 52-1 and 52-2 have counters 53-1 and 53-2, respectively. The counter 53-1 counts up when cell data is written to the class 1 buffer memory 52-1. In addition, the counter 53-1 counts down whenever cell data is read from the class 1 buffer memory 52-1. The counter 53-2 operates for the class 2 buffer memory 52-2 in the same manner as the counter 53-1. Thus, with the count values of the counters 53-1 and 53-2, the data amount of cells stored in the class 1 buffer memory 52-1 and class 2 buffer memory 52-2 can be determined. The count values of the counters 53-1 and 53-2 are sent to an output control unit 54.

Cells read from the class 1 buffer memories 52-1 and 52-2 are input to a selector 55. The selector 55 selects and multiplexes cells received from the class 1 buffer memory 52-1 and class 2 buffer memory 52-2 corresponding to a select command received from the output control unit 54.

When a call is set, the output control unit 54 allocates output bands to the classes 1 and 2 corresponding to a notified quality class (service type) and a declared band, so that the ratio of the output bands of the classes 1 and 2 becomes a predetermined value. The selector 55 selects cells received from the class 1 buffer memory 52-1 and class 2 buffer memory 52-2 corresponding to the output bands (select commands).

The output control unit 54 allocates the capacities of the class 1 buffer memory 52-1 and the class 2 buffer memory 52-2 corresponding to the output bands allocated to the classes 1 and 2 and the maximum allowable delay time required by each class. When one of the capacities of the buffer memories 52-1 and 52-2 is increased, the cell discard ratio in the buffer memory decreases, however, the cell transmission delay time increases. On the other hand, when the capacity of one of the buffer memories 52-1 and 52-2 is decreased, although the cell transmission delay time is decreased, the cell discard ratio is deteriorated. Thus, the capacities of the buffer memories 52-1 and 52-2 are optimally allocated corresponding to the characteristics of services allocated to the classes. This allocation is performed by setting threshold values for the counter values of the counters 53-1 and 53-2. When the counter values exceed their threshold values, cells are prohibited from being written to the corresponding buffers. Thus, the cells are discarded.

The output control unit 54 can change the capacities of the buffer memories 52-1 and 52-2 whenever a call is set. In this case, the threshold values of the counters 53-1 and 53-2 are changed by the connection admission control software corresponding to the declared bands of the classes.

The output control unit 54 changes the read bands allocated to the classes corresponding to the data amount of cells stored in the class 1 buffer memory 52-1 and the class 2 buffer memory 52-2, namely the count values of the counters 53-1 and 53-2. When the data amount of cells stored in the class 1 buffer memory 52-1 becomes less than a predetermined value, the read band of the class 1 is unnecessarily larger than the write speed thereof. In other words, the cell discard control is performed with much higher quality than that required for the class 1. Thus, in this case, the read band of the class 1 can be reduced and the remaining band can be allocated to the class 2. The read bands $W_1$ and $W_2$ of these classes can be calculated as follows.

$$W_1=(L_1/(D_1-L_1))\times K_2$$

$$W_2=(L_2/(D_2-L_2))\times K_1$$

where $L_1$ is the storage capacity of cells stored in the class 1 buffer memory 52-1, $L_2$ is the storage capacity of cells stored in the class 2 buffer memory 52-2, $D_1$ is the maximum allowable delay time of the class 1, $D_2$ is the maximum allowable delay time of the class 2, $K_1$ is the read band of the class 1 buffer memory 52-1 when a call is set, and $K_2$ is the read band of the class 2 buffer memory 52-2 when a call is set.

The output control unit 54 changes the storage capacities of the class 1 buffer memory 52-1 and the class 2 buffer memory 52-2 corresponding to the read bands being reallocated. However, the storage capacities changed by the output control unit 54 should satisfy the maximum allowable delay time required by the classes 1 and 2. The capacities $Q_1$ and $Q_2$ of the class 1 buffer memory 52-1 and the class 2 buffer memory 52-2 are calculated by for example the following equation.

$$Q^i=D_i\times(W_i/\Sigma W_i)$$

Figure 11:
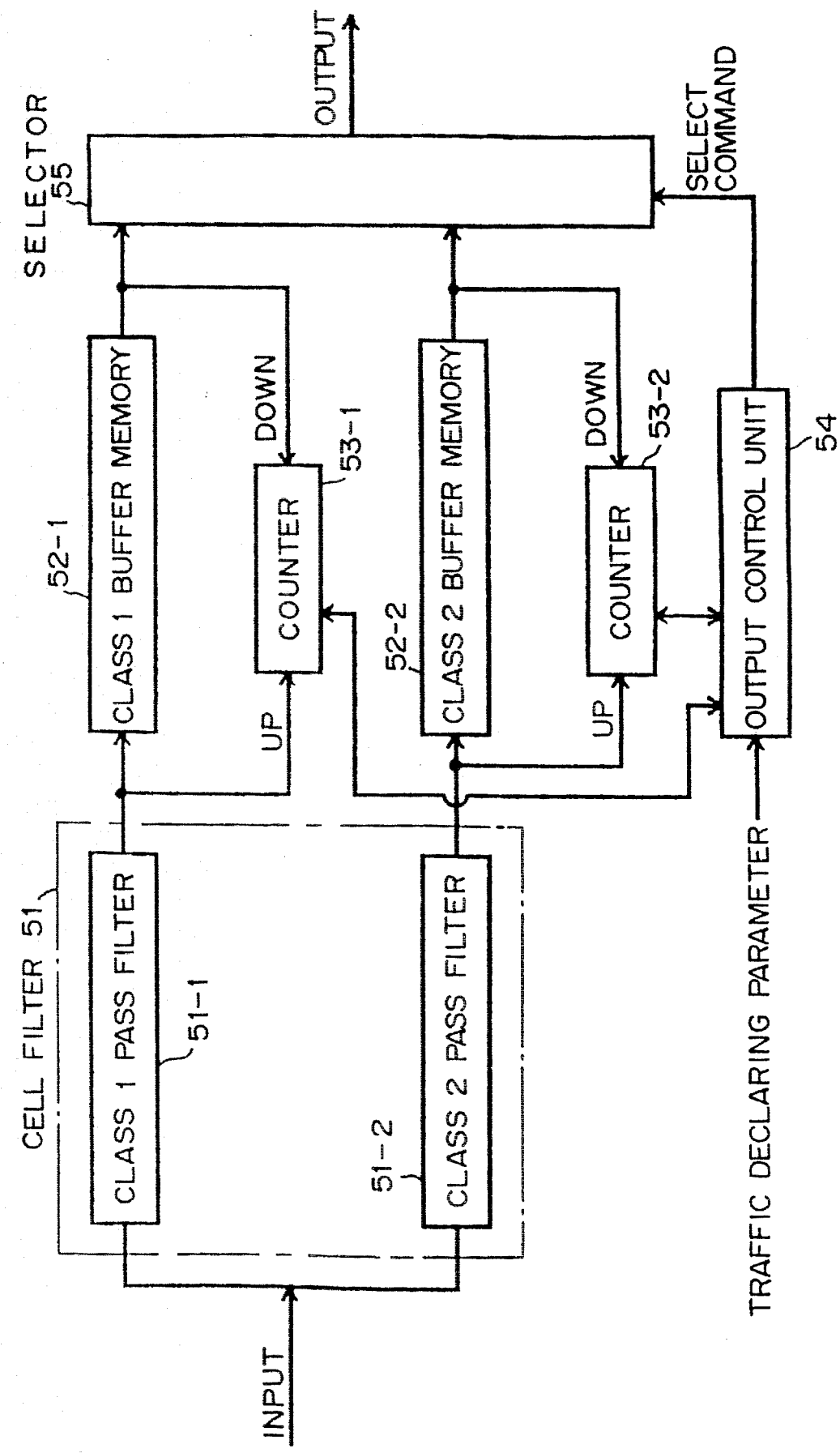
FIG. 11 is a block diagram showing another construction of the circuit of FIG. 5 or FIG. 7.

Thus, according to the embodiment shown in FIG. 11, when the storage capacity of cells stored in the buffer of a particular class decreases due to the fluctuation of the traffic of the class, the read band of the class is decreased in the range of the maximum allowable delay time. Thus, the remaining band can be allocated to the other class. Consequently, the total cell transmission efficiency can be improved.

As described above, according to the switching path setting method of this embodiment, a plurality of quality classes are allocated to the switching equipment and input cells are allocated to the quality classes corresponding to service types thereof. The cell discard control is performed for each quality class. Thus, even if cells are discarded due to congestion or the like of a particular service, the quality of other services is not deteriorated.

When the quality control is performed between an input line and a switch, cells that are input from the line are written to a buffer corresponding to the quality class thereof. The cells are read from the buffer corresponding to the quality class to the predetermined band allocated to the quality classes. However, since the sum of the read bands is equal to or less than the band of the path of the switch, cells are not discarded in the switch. Thus, with the conventional switch, quality control can be easily performed for each service.

On the other hand, when quality control is performed between the switch and an output line, cells that are output from the switch are written to the buffer corresponding to the quality class thereof. Cells are read from the buffer corresponding to the quality class to the band allocated to the quality class. However, since the read band is shared with the clock band of the service of an output line with a predetermined ratio, even if output cells are concentrated to a particular output line, cells are discarded in the buffer for each service. Thus, the cell discard does not affect other services.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A switching system for switching a fixed length cell including a header field having control information indicating a quality class thereof and route information for a route to be switched and an information field of data, said cell being transmitted from an input link to an output link, the switching system comprising:

an interface circuit for receiving the cell from the input link and for generating and outputting a selection information designating a quality class allocated to the cell being transmitted in accordance with the control information of the cell;

a buffer for storing the cell received from the interface circuit; and a buffer control circuit for storing, in response to the selection information of the cell received from the interface circuit, the cell in a selective address of the buffer determined by the selection information.

2. The switching system according to claim 1, wherein said interface circuit has a conversion table that defines the relation between a cell identifier stored in the header field of the cell and the quality class thereof, and wherein said interface circuit allocates the quality class to the cell in correspondence with the conversion table.

3. The switching system according to claim 1, wherein said interface circuit allocates the quality class as tag information of the cell.

4. The switching system according to claim 1, further comprising read control means which reads a cell of a quality class from said buffer at a predetermined bandwidth allocated to the quality class.

5. The switching system according to claim 4, further comprising switch means coupled to said interface circuit, wherein said read control means controls the sum of bandwidths allocated to each quality class of a plurality of cells to be transmitted so that said sum is equal to or smaller than a bandwidth of a path of said switch means.

6. The switching system according to claim 4, wherein said read control means calculates the sum of declared bandwidths of cells for each quality class of a plurality of cells to be transmitted, determines a bandwidth read from said buffer in correspondence with a the sum of the declared bandwidths for each quality class, and reads a cell from said buffer in correspondence with the read bandwidth.

7. The switching system according to claim 4, wherein said read control means discards a cell of a quality class when a data amount of a plurality of cells of the quality class stored in said buffer exceeds a threshold value allocated to the quality class.

8. The switching system according to claim 4, wherein said read control means changes the capacity of said buffer, allocated for each quality class of a plurality of cells to be transmitted in correspondence with a data amount of cells stored in said buffer for each quality class.

9. The switching path setting system according to claim 4, wherein said read control means changes a bandwidth allocated to each quality class of a plurality of cells to be transmitted in correspondence with a data amount stored in said buffer for each quality class and reads a cell from said buffer in correspondence with a changed bandwidth.

10. The switching system according to claim 4, further including an output interface coupled to said output link, wherein said read control means reads a cell from said buffer in synchronization with a transmission clock from said output interface.

11. A method of storing a fixed length cell to be transmitted from an input link operatively coupled to a switching system, to an output link, said cell including a header field containing control information indicating a quality class thereof and route information indicating a route to be switched and an information field of data, the method comprising the steps of:

receiving the cell from the input link;

generating and outputting a selection information designating a quality class allocated to the cell in accordance with the control information of the cell;

selecting an address of a buffer at which the cell is stored, in response to the selection information of the cell; and storing the cell at the selected address of the buffer.

* * * * *